INVENTOR
FRANCIS O. UNDERWOOD
BY Paul M. Brannen
AGENT

March 29, 1966 F. O. UNDERWOOD 3,243,782
DATA HANDLING SYSTEM

Filed Dec. 27, 1961 11 Sheets-Sheet 3

March 29, 1966   F. O. UNDERWOOD   3,243,782
DATA HANDLING SYSTEM
Filed Dec. 27, 1961   11 Sheets-Sheet 4

March 29, 1966 F. O. UNDERWOOD 3,243,782
DATA HANDLING SYSTEM
Filed Dec. 27, 1961 11 Sheets-Sheet 10

3,243,782
DATA HANDLING SYSTEM
Francis O. Underwood, Endwell, N.Y., assignor to International Business Machines Corporation, New York, N.Y., a corporation of New York
Filed Dec. 27, 1961, Ser. No. 162,449
6 Claims. (Cl. 340—172.5)

This invention relates in general to a system for handling a plurality of randomly arranged character data, and in particular to a data handling system for sorting a file of randomly stored record blocks of character data into a predetermined ordered sequence.

The invention disclosed and claimed herein is an improvement over that disclosed and claimed in a copending application Serial No. 753,441, filed on August 6, 1958, and assigned to the same assignee as this application, now U.S. Patent 3,034,102, issued May 8, 1962.

It is well recognized that sorting is a basic procedure in business and scientific data processing because it facilitates ready reference to any single item in a large file of information, and makes possible the collation of one file of data with another. Notwithstanding the fact that there are several sorting techniques now known for manipulating items of information into a predetermined ordered sequence, one of the most acute problems at the present time with regard to the efficient utilization of apparatus for providing a data processing operation, is that of sorting a large tape file of many groups, i.e., record blocks, of data. In line with the foregoing, most sorting techniques which can be accommodated by an electronic computer system, for example, require extensive programming as well as a considerable amount of expensive computer time. Furthermore, other sorting techniques which do not require excessive computer time do, however, make it necessary that additional data storage equipment, such as several magnetic tapes for example, be utilized.

The present invention is directed to the alleviation of this data sorting problem, and has for its broad object, the provision of an improved data handling system. In line with the foregoing, another broad object of this invention is to provide an improved sorting system for arranging randomly recorded information into a predetermined ordered sequence.

Another object of this invention is to provide an improved tape file sorting system which is faster operating, more efficient and less expensive than any known heretofore.

The illustrative embodiment of the present invention is a multihead, off-line, magnetic tape sorter system which does not required programming and which efficiently arranges a file of record blocks each of which includes at least one character data, into a predetermined ordered sequence. Briefly described, this sorter system is one wherein a plurality of pairs of associated read and write magnetic heads are arranged in operating relationship to a magnetic tape file whereon a plurality of randomly arranged record blocks are stored. Furthermore, these pairs of magnetic heads are operatively spaced in accordance with an arithmetic progression which is defined by the spacing of equal length record blocks stored on the tape file. This arithmetic progression can be defined by the expression, "$a, a+d, a+2d \ldots a+nd$," wherein "$a$" and "$d$" are each integers 1; i.e., the value "1," which represents a tape file distance that is defined by the spacing between equal length record blocks. Thus, as the magnetic tape file is advanced relative to the aforesaid pairs of tape file information operating heads, a plurality of stored character data are read simultaneously from the tape file through the arithmetically spaced heads into a so-called data compare-sort apparatus. The signals representing these character data are dispatched through the compare-sort apparatus to the output thereof so that they appear simultaneously thereat on a plurality of separate electrical lines designated high to low data according to their relative magnitude. That is, these "high to low" data appear on their respective high to low lines so that they are rerecorded onto the magnetic tape file in a predetermined ordered sequence by certain select write heads.

Thus, according to the basic concept of the present invention, randomly provided input information from a plurality of data sources is dispatched through a data compare-sort apparatus which is operatively connected to pairs of associated information handling elements operatively arranged in an arithmetic progression with respect to the spacing of the information in information memory. Accordingly, another object of this invention is to provide apparatus capable of operating in accordance with this concept.

Another object of this invention is to provide a sorting system which utilizes a single magnetic tape sort file for first providing the randomly arranged input information required to be sorted, and then storing the sorted information as it is rerecorded thereon in a predetermined ordered sequence.

Referring once again to the illustrative embodiment of the present invention, if a sufficient number "H" of magnetic read-write heads is arranged in an arithmetic progression with respect to the "R" record blocks stored randomly on the tape file so as to satisfy the inequality $$H \geq \frac{1+\sqrt{8R-7}}{2}$$

wherein "H" is the least integer equal to or greater than the right-hand term, the randomly arranged record blocks can be rerecorded on the tape file in an ascending ordered sequence, during a single pass of the tape file.

However, the number of heads required for such a single pass sorting operation becomes uneconomically high as the number of records increased. Therefore, it is preferable to use a relatively small number of heads and to make a number or sorting passes, achieving a good balance between cost and operating speed.

For a lesser number of heads, the number of passes, P, required to sort R records with $h$ heads is $$P = \frac{\sqrt{2R-1}}{h-1}$$

Also, when fewer heads are used, the spacing therebetween must be altered with each pass. The widest spacing of adjacent heads for the first pass is given by the relation $$S = \sqrt{2R-1}$$

where S is the spacing in terms of the number of records between the widest spaced pair of heads, and R is the total number of records in the file to be sorted.

Accordingly, a particular object of this invention is to provide a tape sorting system in which the lengths of the sorting tape between the heads is automatically altered at each pass, to thereby effectively vary the head spacing with respect to the number of records between adjacent heads.

A further object of the invention is to provide an improved tape sorting system in which an endless loop of metallic tape, sprocket driven to eliminate slippage problems, is used as a temporary storage for the sorting operation.

Still another object of the invention is to provide an improved tape sorting system adapted to operate with a plurality of input and output tape units of conventional design.

The foregoing and other objects, features and advantages of the invention will be apparent from the following more particular description of a preferred embodiment of the invention, as illustrated in the accompanying drawings.

Figure 1A:
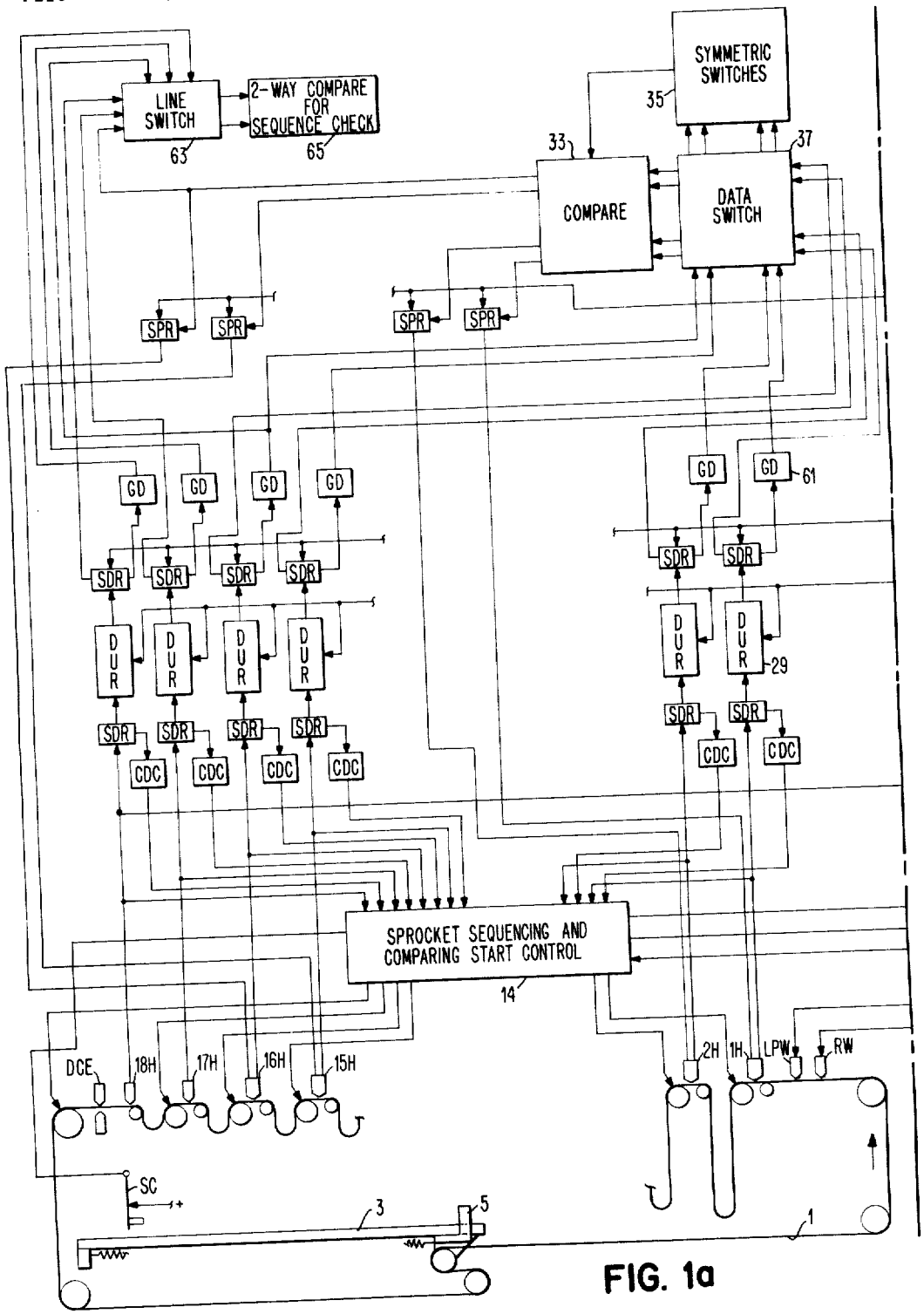
FIGS. 1a and 1b are schematic diagrams of a preferred embodiment of the invention.

Conventional logic element symbols are used in the drawings to designate the logic elements by function. The detailed structure of these elements is not shown, since they may utilize tubes, transistors, magnetic cores, etc., and their actual form is not pertinent to the present invention.

Figure 1B:
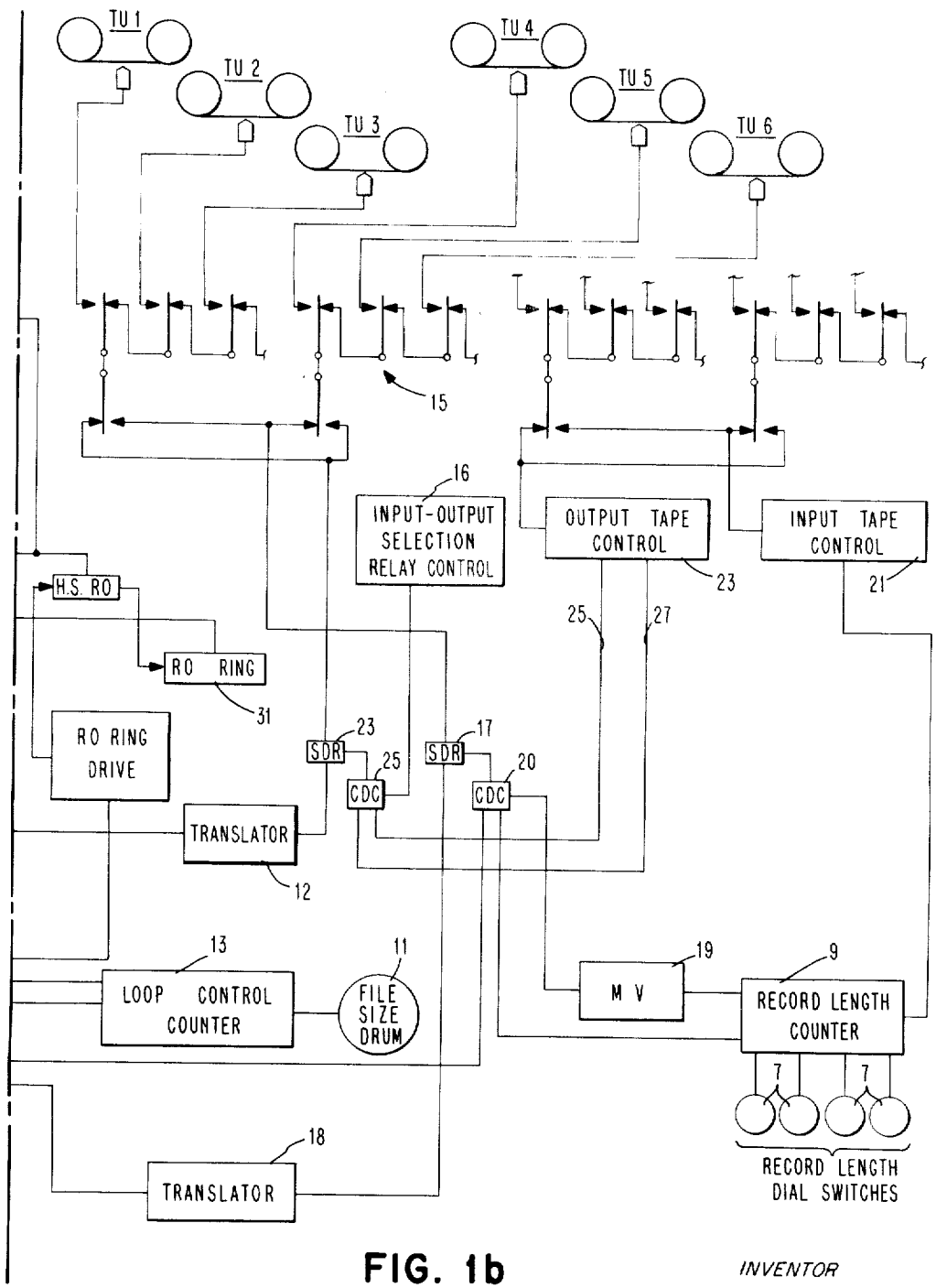

Referring to the drawings, FIGS. 1a and 1b show the general schematic diagram of the tape sorting system. According to the present invention, the reference character 1 is an endless metallic magnetic tape of suitable material provided with sprocket holes and arranged to be looped over a number of sprockets or capstans, as can be seen in the drawing. In a manner to be subsequently described, the tape is looped to various amounts between adjacent sets of sprockets so that appropriate spacings are provided in the amount of record blocks contained on the tape between the sorting stations. In order to provide sufficient slack tape, a slack tape adjuster mechanism is shown at 3, comprising a spring biased pulley 5, arranged to take up whatever slack there is in the tape and also to permit enough slack to be run out in order to provide adequate lengths of loops between adjacent stations. When there are no loops in the tape, and all of the slack is taken up, a slack contact SC is operated by the slack adjustment mechanism.

A plurality of sorting stations, each having a sprocket drive and tape read and write heads with associated amplifying equipment are indicated symbolically along the tape path, such as the recording heads RW and LPW, and the read-write heads designated by the reference characters 1H, 2H, 15–18H. It is to be understood that while similar stations are provided in the interval between the heads 2H and 15H, all of the sorting stations are not shown in order to clarify the drawings. Following the last sorting station with read-write heads 18H, there is a D.C. erasing station DCE, which removes old information from the tape at that point so that the fresh information may be recorded when the tape continues around its path and travels past the various read-write stations thereafter.

The information to be sorted is recorded on tape units of conventional design, the actual structure of which forms no part of the present invention, and is therefore only shown schematically as indicated by the reference characters TU1 through TU6. These tape units, carrying the tape records which are to be sorted by the tape sorter, are connected to the tape sorting system via input-output selection control relays. These relay contacts, governed in a manner subsequently described, are arranged to connect appropriate ones of the tape units TU1 through TU3 as input units and TU4 through TU6 as output units, or vice versa, at different times in accordance with the manner in which the information recorded in these units is transferred to the sorter for sorting and thereafter transferred to the tape units after having been sorted.

The operation of the sorter requires that the unsorted tape placed in the tape units, such as TU1 through TU3, be prepared with a number equal to the record length attached to the terminal end of each record when the records are of variable length. At the beginning of a sorting operation, the machine operator inserts a number equal to the length of the longest record into the system by operation of a plurality of record length dial switches 7, which set the record length into a record length counter 9.

Another factor which must be entered prior to a sorting operation is the size of file or number of records to be sorted. This is entered into the system by operation of a drum switch 11, the construction of which will be explained later, but the settings of which control the values set into a loop control counter 13. The loop control counter 13 enters into the control of the sprocket sequencing and comparing start control unit 14, which is arranged to control the application of driving and braking forces to the sprockets at each of the reading stations, as shown in the drawing. The sprocket sequencing and comparing start control circuitry is arranged so that when in operation the proper loops are formed between the sorting stations in order to perform the sorting operation.

During the sorting process, the first record written on the sorter tape will pass to the first sorting station and will be read therefrom by the read heads and compared with the data read at the other sorting stations which would be all blanks in the first instance. After a predetermined delay, the first record will be read at the second sorting station and some subsequent record will be read at the first sorting station. These are compared and, if in order, will be written back on the tape in the same order but, if not in order, they are interchanged. The process continues until a record emerges from the last sort station whereupon it and the succeeding records are written in an output tape unit. The records are partially sorted by the first run unless it should happen that the sequence checking device supplied with the arrangement indicates that the file has been fully sorted. If only partially sorted, the output tape again is connected to re-enter the partially sorted information into the system and it is then sorted and placed onto the tape in another of the tape units, the process being repeated until the sorting operation is completed. On each of the passes, the loops of tape existing between the different sorting stations must be adjusted to the proper size in accordance with the previously explained relations.

The original tape file information enters the sorter through the input switching relay circuits, designated generally by the reference character 15, which selectively connect the tape units TU1 through TU3 as input storage devices and TU4 through TU6 as output storage devices by operation of circuitry designated generally by the rectangle labeled INPUT-OUTPUT SELECTION RELAY CONTROL, and bearing reference number 16. The information entering from the selected tape unit is passed to a single digit register 17, to be described in detail later, and the output of the register is supplied to a translator 18 where the information is translated into an eight bit collatable code and thence supplied to a record write head RW which writes the information on the endless loop sorter tape. The outputs from the single digit register are also supplied to, character detection circuits CDC, indicated by the rectangle 20, the details of which will be subsequently described but which circuits provide a first character detection which is utilized to supply a signal to a lead pulse write head LPW, to provide a suitable lead pulse recording which is used to govern the operation of the sorting equipment by providing appropriate lead pulse signals ahead of each record. The character detection circuit 20 also controls the output of a multivibrator or other pulse source 19 to the record length counter 9, the parts being arranged so that the record length field indication provided on the original tape file is subtracted from the manually set record length in the record lentgh counter and the result is used to control the operation of the input tape units via the input tape control circuits 21. As the sorting operation proceeds, the records on the sorter tape 1 are read off at the sorting station 18H, and are supplied through translator 12 and a single digit register 23 to the input-output selection relay network 15, and thence to the selected output tape unit which may be any one of the tape units TU1 through TU6, and selected by the input-output selection relay control 16, which is governed by a character detection circuit 25, this circuit also controlling the operation of the output tape control unit 23 to provide both gap codes over a line 25 and record mark signals over a line 27. The control of the start and stop of the input tape control units by the record length counter provides that the same amount of space will be taken up on the sort tape 1 by each record read in from a selected input tape unit.

As data is sensed at the first sort head 1H at the first sorting station, it is stored in an associated storage register indicated by the rectangle labeled DUR, designated as a duplex register and indicated by reference character 29. The highest order digit of the record is stored in the highest order position of the register, succeeding digits being stored in succeeding positions.

During this time, all of the sprockets driving the sorting tape 1 are turning during the writing of the first record. The detection of the first lead pulse at the second sorting station by sorting head 2H will cause the sprocket sequencing and comparing start control 14 to stop all sprockets except the first so that the first digit of the first record will stop just short of the reading head 2H at the second sorting station. The first digits of each succeeding record passing the first starting station reading head 1H are counted and, when the proper number of records are stored in the loop of sorting tape between sorting stations 1 and 2, as determined by the manual setting of the file size drum and the loop control counter 13, all sprockets again start turning. At this time, of course, the effective distance between the first and second sorting stations has been established by causing a loop of the proper dimensions to be formed therebetween.

At this time, the counter is automatically set to count one less than before and, as the lead pulse of the first record passes the head 3H at the third sorting station, the sprocket sequencing and comparing start control again causes all sprockets to stop except the first and the second, with the first record stopping just short of the read head 3H at the third sorting station.

Records continue to be counted at the first sorting station and, as the counter runs out, all the sprockets are started, the result being that one less record is stored in the loop between the sorting station 2 and sorting station 3 than is stored between sorting station 1 and sorting station 2. The process continues, each of the loops of the sorting tape containing one less record than the preceding loop until the proper length of loop is generated between each pair of heads at the sorting stations. At the end of this operation, therefore, the relative positioning of the heads at the sorting stations is in accordance with the arrangement as described and claimed in U.S. Patent 3,034,102.

Sorting starts when the reading heads at the first two sorting stations, 1H and 2H respectively, are reading records. As soon as each head has detected and stored the first digit of their respective records in the associated duplex registers, their common read-out ring 31 reads out the high order digits simultaneously and in serial form to the comparing and switching circuit, including the compare unit 33, the symmetric switches 35, and the data switches 37. The comparing circuits including the units 33, 35 and 37 are constructed and arranged in a manner disclosed and claimed in a copending application for Letters Patent in the United States Serial No. 753,442 filed on August 6, 1958 in behalf of F. O. Underwood for Data Comparing And Sorting Apparatus, now U.S. Patent 3,034,103 issued May 8, 1962. A detailed understanding of this sorting arrangement may be obtained by examination of the referenced application. The output of the data switching circuits is directed to the proper output single-digit registers and is then transmitted to the write windings of the proper sorting heads in parallel by bit form.

The thirty-digit duplex registers are required for each sorting station because of the "out-of-phase" condition that will exist at the heads due to the inability to precisely control the start-stop characteristics of the sprocket drive clutches which serve to connect the sprocket wheels at each sorting station to the common drive mechanism. Thirty digits of buffering allows sufficient misregistration to enable the sorter system to operate properly despite variations within limits of the operation of the clutches.

When the RO ring starts, the read out takes place from the first position of each duplex register simultaneously. At the next digit time, the second position of each duplex register will be read out simultaneously. This process continues even as the other positions of the duplex registers are being filled from the sorting stations.

This process continues with every digit of every record entering the proper registers. When an "end of record" mark is sensed for any record, the "read-in" ring for the corresponding register, which is not shown in the drawing but which is of conventional design, will be reset to the first position and the read-out ring is disconnected from the particular register until end of record marks and the next "first digits" have been sensed at all of the sorting stations. Eventually, when the proper number of records are stored in the loops between the sorting stations, all heads will be reading and writing and as soon as information is detected at head 18H, the data will be written on the output tape, which may be any of TU1–TU6. For each of the sorting stations, the data-handling apparatus also includes a gap code detecting circuit indicated by the rectangle labeled GD, and designated by the reference character 61, and there is also provided a line switch 63 and a two-way comparing circuit 65, which are associated with the last two sorting stations including the heads 17H and 18H, which provide for appropriate sequence checking as an indication that the information written on the output tape is in the desired sequence, and that the end of the sorting operation has been reached.

*Detailed description*

Figure 2:
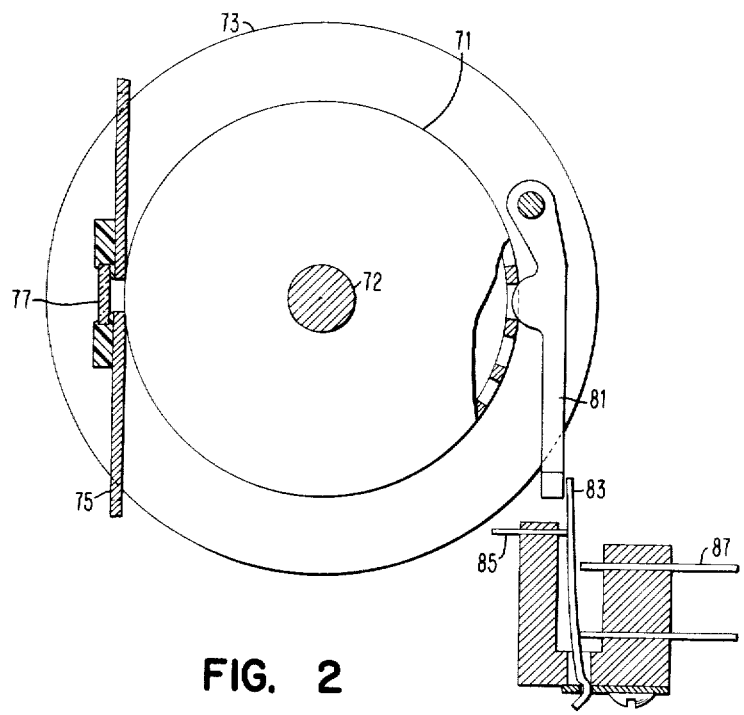
FIGS. 2 and 3 are diagrammatic views of the structure of a file size drum switch which is employed in the present invention.
Figure 3:
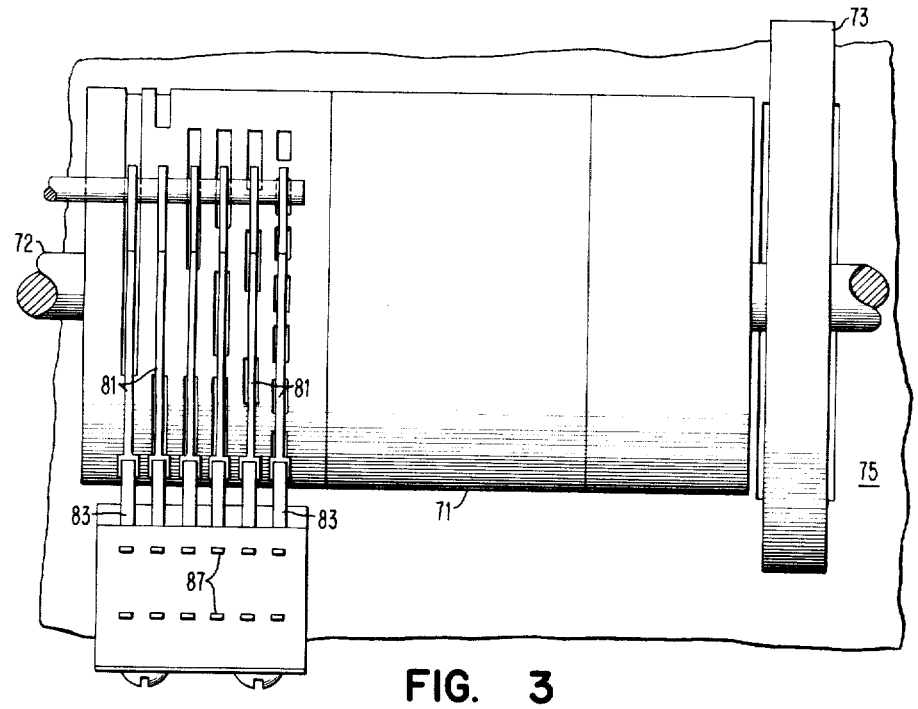

Referring now to FIGS. 2 and 3 of the drawings, there is shown one form of the mechanical arrangement which may be employed for the file size drum switch previously indicated in FIG. 1b at reference character 11.

As shown in FIGS. 2 and 3, the switch comprises a drum or cylinder 71 mounted on a shaft 72 for rotation thereon, and connected to a hand wheel 73 which is arranged to project through an opening in the machine cabinet front wall 75. The surface of the drum may be observed through a transparent window 77, affixed to a horizontal slot in the front wall of the machine cabinet. Rotation of the drum 71 causes the operation of a plurality of cam levers 81, as a result of a lobed portion of the lever engaging slots in the wall of the cylinder 71 in a predetermined pattern to be subsequently described. When a slot or opening in the cylinder 71 is located so that the lower portion of the lever 81 can enter the slot, a movable contact 83, operated by the lever, engages a first fixed contact 85, whereas when the drum is rotated so that a solid portion of the cylinder engages the low portion of lever 81, the contact 83 is moved out of engagement with contact 85 and into engagement with another stationary contact 87. Six such contact assemblies are provided and it will be readily apparent that these can be operated in various combinations by rotation of the drum to different positions. The data appearing in the window 77 upon rotation of the wheel 73 is contained in two columns, the first designated as the characters per record column, and the second as the records per file column. The corresponding numbers, together with the appearance of the slots which are cut in the drum 180° opposite to the characters on the drum, are illustrated in FIG. 4.

In operation, the operator turns the hand wheel until the appropriate "records per file" numbers appear in the window. The "characters per record" number that appears is inspected and the operator determines whether this number is greater, equal to, or less than the "characters per record" of the file to be sorted. If the inspected number is greater than, or equal to, the "characters per record" of the file, no further setting of the hand wheel is required. If "less than," the hand wheel must be set to the proper "characters per record" position. The setting of the drum to the proper values operates the set of six contacts, as described, in connection with FIGS. 2 and 3, which contacts are wired to control the loop control counter 12.

Figure 4:
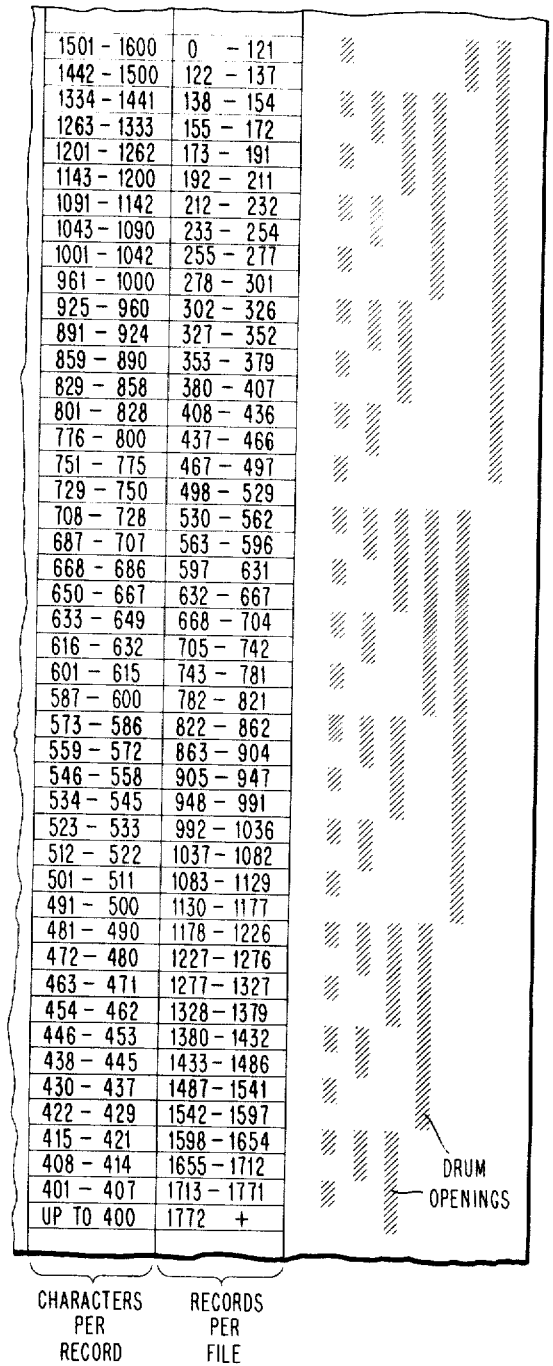
FIG. 4 is a diagrammatic view of the surface of the drum switch.
Figure 5:
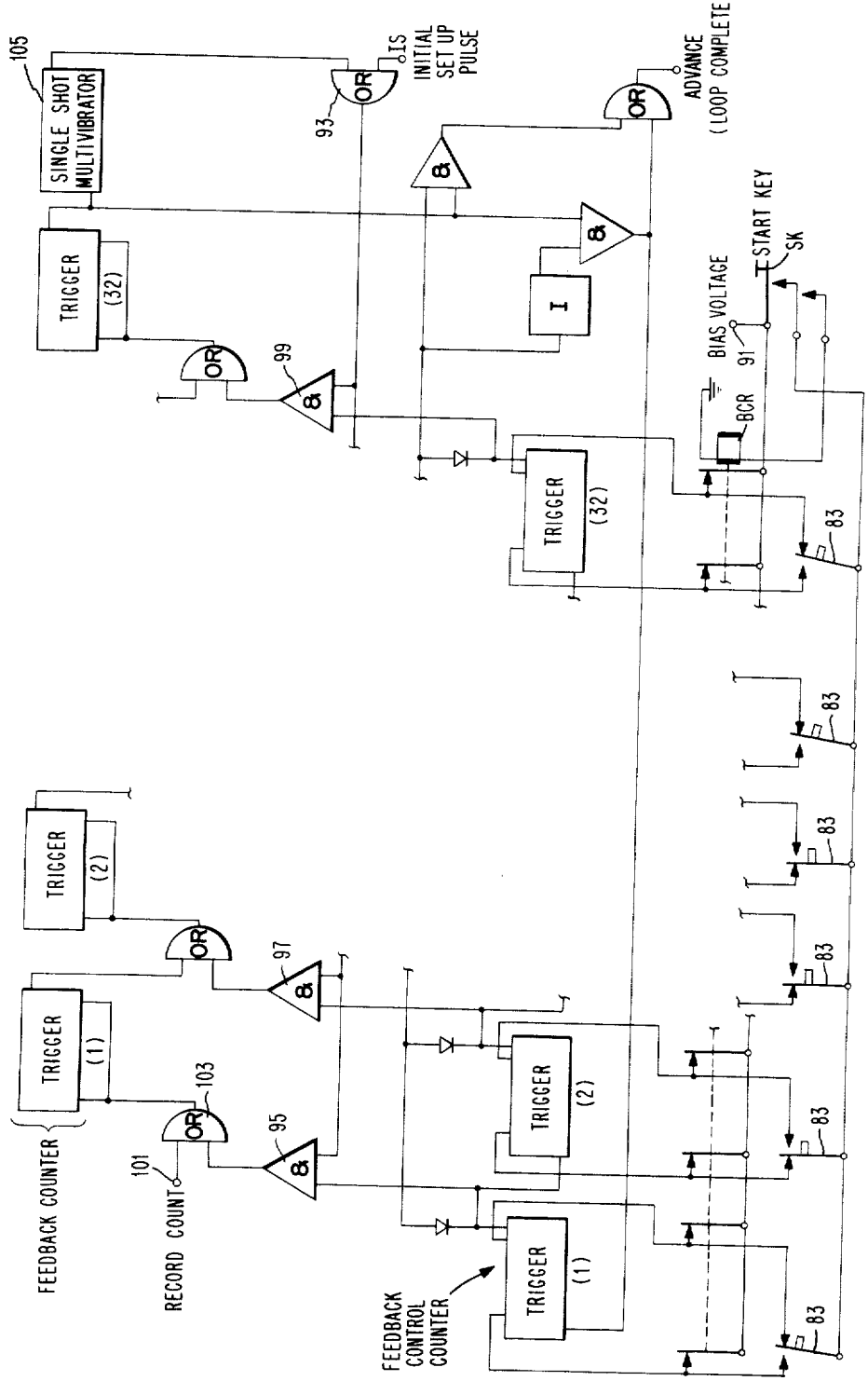
FIG. 5 is a schematic diagram of the loop control counter employed in the present invention.

Referring now to FIG. 5 of the drawings, depression of the start key SK, for the first pass or operation of the sorter, connects the source of bias voltage at terminal 91 to the common control contacts 83 operated by the drum switch previously described in FIGS. 3 and 4. Further depression of the key causes the second contact thereof to be closed to thereby energize bias control relay BCR which removes the bias voltage from direct connection to the triggers of the feedback control counter. It will be noted that bias control voltage is normally supplied to each side of each trigger in the feedback control counter over a normally closed contact of the bias control relay BCR. However, with the operation of the start key, the bias control voltage is applied only through the contacts 83 of the file size drum control switch, so that the triggers in the feedback control counter are set on or off in accordance with the setting of the contacts of this switch. Thus, each of the triggers in the feedback control counter is turned either ON or OFF, depending upon whether the contact is to the right or to the left, as shown in FIG. 5, corresponding to whether or not the contact operating lever B is in a hole or slot of the drum, as shown in FIGS. 2 and 3.

Release of the start key SK causes the bias control relay to also release and applies bias voltage to all triggers. However, the triggers will not change state at this time and, further, the release of the key removes the bias voltage from the drum switch setup contacts 83. At this time, the feedback control counter is set to the binary equivalent of 64–S, assuming that six stages are supplied in the feedback control counter, only three of which have been shown for the sake of clarity, and in this instance where S is the length of the longest loop to be generated as determined by the coding of the setup contacts.

Immediately following the release of the start key, an initial setup pulse is applied automatically at the terminal IS, in FIG. 5, which pulse is supplied through an OR circuit 93, and via a plurality of AND circuits 95, 97 and 99, one of which is associated with each stage in the feedback control counter to the triggers of the feedback counter, the stages of the feedback counter are thus set in accordance with the value placed in the feedback control counter. There are as many stages in the feedback counter as there are in the control counter, each of these stages being connected as a binary operated device so that alternate impulses thereto cause the stages to turn on and off in a well-known manner. All of this arrangement is similar to that disclosed and claimed in U.S. Patent 2,889,987, granted June 9, 1959, to M. P. Marcus and F. O. Underwood for "Electrical Counter for Diminishing Counts."

The further operation of the control counter is dependent upon the sensing of records at the first sort station and, as the first digit of a record is sensed at the first sort station, a record count pulse is applied at one input 101 of an OR circuit 103, to the input of the first state of the feedback counter, causing this counter to advance. Subsequent record count pulses applied thereto will cause the feedback counter to advance and when S–1 impulses have been applied all stages of the feedback counter will be in the ON state. The next pulse will cause all trgigers to turn OFF thereby causing the single shot multivibrator 105 connected to the output of the last stage of the feedback counter to turn on for a period longer than the "settle down" time of the triggers and also causes the feedback control counter to advance one unit. When the single shot multivibrator 105 turns off, it sets the feedback counter to the value of the feedback control counter which, at this time, is now one unit more than the previous setting. Each output from the feedback counter indicates that a loop has been formed of the proper length, each such loop containing one less record than the previously formed loop.

As the first digit of a record to be sorted is written on the sort tape 1 from an input tape unit, a "lead" pulse is written in the ninth channel of the sorting tape by the ninth "write" head which is displaced from the normal data "write" heads in the direction of tape motion. The amount of displacement is determined by the start-stop characteristics of the sprocket drive. Assuming that the sorting tape will move, for example, ¼ inch after a stop signal is given and that the sorting tape will move another ¼ inch to attain full speed after a start signal is given, then the displacement or lead referred to is the sum of these two values or ½ inch, for example.

Figure 6A:
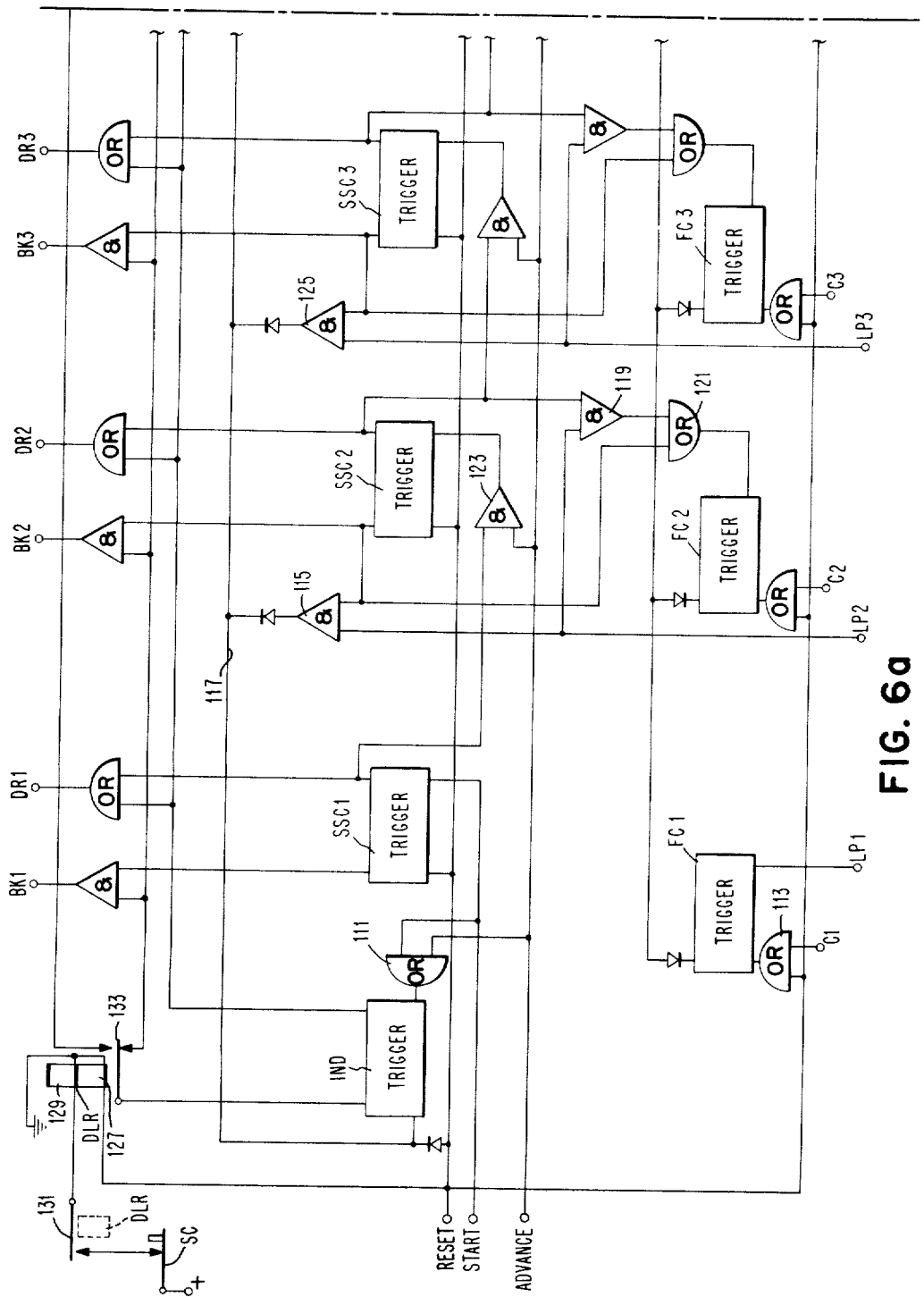
FIGS. 6a and 6b are schematic diagrams of the sprocket controls employed in the present invention.

At the start of the sorting operation, all sprockets are turning. As the lead pulse is detected at the first sorting head, the counting begins. When the first lead pulse is detected at the second sort head, all sprockets except the first come to a stop and a loop thus begins to form between the first and second sorting stations. When the 8th lead pulse is detected at the first sorting station, all sprockets turn until the first lead pulse is detected at the third sort station at which time all sprockets except the first and the second stop. The process continues in this fashion untill all of the loops are formed. The portion of the circuit particularly associated with the operation of the sprocket drives and brakes in the proper order in order to form the proper size loops between the sorting stations is illustrated in detail in FIGS. 6a and 6b, placed side by side with FIG. 6b to the right of FIG. 6a. The circuits comprise a first set of triggers designated by the reference characters SSC1 through SSC18, and designated as the sprocket sequencing control triggers. A second set of triggers designated by the reference characters FC1 through FC18 are designated as the first character triggers. The circuitry also includes a timing or index trigger IND which, when set ON, causes all of the sprockets to drive regardless of the setting of the SSC triggers. When the index trigger IND is set ON, one of the inputs to the OR circuits associated with each of the sprocket drives, such as the OR circuit having the output terminal DR1, is energized by the output from the right-hand side of trigger IND. It is obvious from an inspection of the drawings that outputs are thus provided to all of the terminals going to the capstan or sprocket drives designated by the reference characters DR1 through DR18. At the same time, since there is no output from the left-hand side of the trigger, the common connection to the AND circuits associated with each of the capstan brakes, having output terminals designated by reference characters BK1 through BK18, will be deenergized, and thus the capstan brakes will not be applied. Thus, no matter what the settings of the SSC triggers are at any time that the index trigger is ON, all of the capstan brakes will be released and all of the drives will be energized. The mechanical details of the sprocket drives and brakes are not shown, since they form no part of the present invention, and can take any of a number of well-known forms. It can also be readily seen from the drawings that with any SSC trigger turned ON, that is, with an output from the right-hand side thereof and the index trigger turned OFF, the particular SSC trigger will energize the associated driving circuit, while the brake circuit will be deenergized since the output from the left-hand side of the associated SSC trigger will hold down the output of the associated AND circuit to the brake circuit.

The "first character" triggers FC1 through FC18 are turned ON when a lead pulse is detected at a corresponding head and is turned OFF when the head is reading a character. When all of the FC triggers are OFF, a common read-out ring is allowed to run so that sorting occurs.

The start pulse turns on SSC1 via the pulse supplied thereto from the terminal designated as start, and also turns on the index trigger IND via the OR circuit 111. At this time, therefore, all of the sprocket brakes are released and the sprocket drive clutches are all energized so that all sprockets turn.

The detection of the first lead pulse at sort head 1 will turn ON trigger FC1, via the pulse supplied from terminal LP1 to the right-hand side of the trigger. A suitable time later, the first character of the first record is read at sort head 1 turning OFF FC1 via a signal through OR circuit 113, and allowing the first record to be rewritten on the sort tape by the write portion of the first sort head. The first "lead" pulse is then detected at sort head 2 and via terminal LP2 it turns off the index trigger, since it is supplied via an AND circuit 115, trigger SSC2 being OFF, to a reset circuit which extends via the buss 117 to the left-hand side of the index trigger. Under this circumstance, therefore, all of the sprockets except the first will stop. FC2 trigger is not turned ON at this time, since the trigger SSC2 is OFF, and there is no input to the right-hand side of the AND circuit 119 and hence no output from OR circuit 121 to the right-hand side of trigger FC2. The lead pulses are counted from the sort head 1 via the record count terminal 101 (FIG. 6b) until an advance pulse is received at the terminal designated advance, which signal will turn ON trigger SSC2 via AND circuit 123, the other input of the AND circuit 123 being energized from the ON side of trigger SSC1. This same advance signal will also turn ON the index trigger via OR circuit 111. As SSC2 goes ON, the negative shift at the OFF side of SSC2 will cause trigger FC2 to turn ON via the OR circuit 121. With the index trigger turned ON, all of the sprockets 1 through 18 will now drive.

Figure 6B:
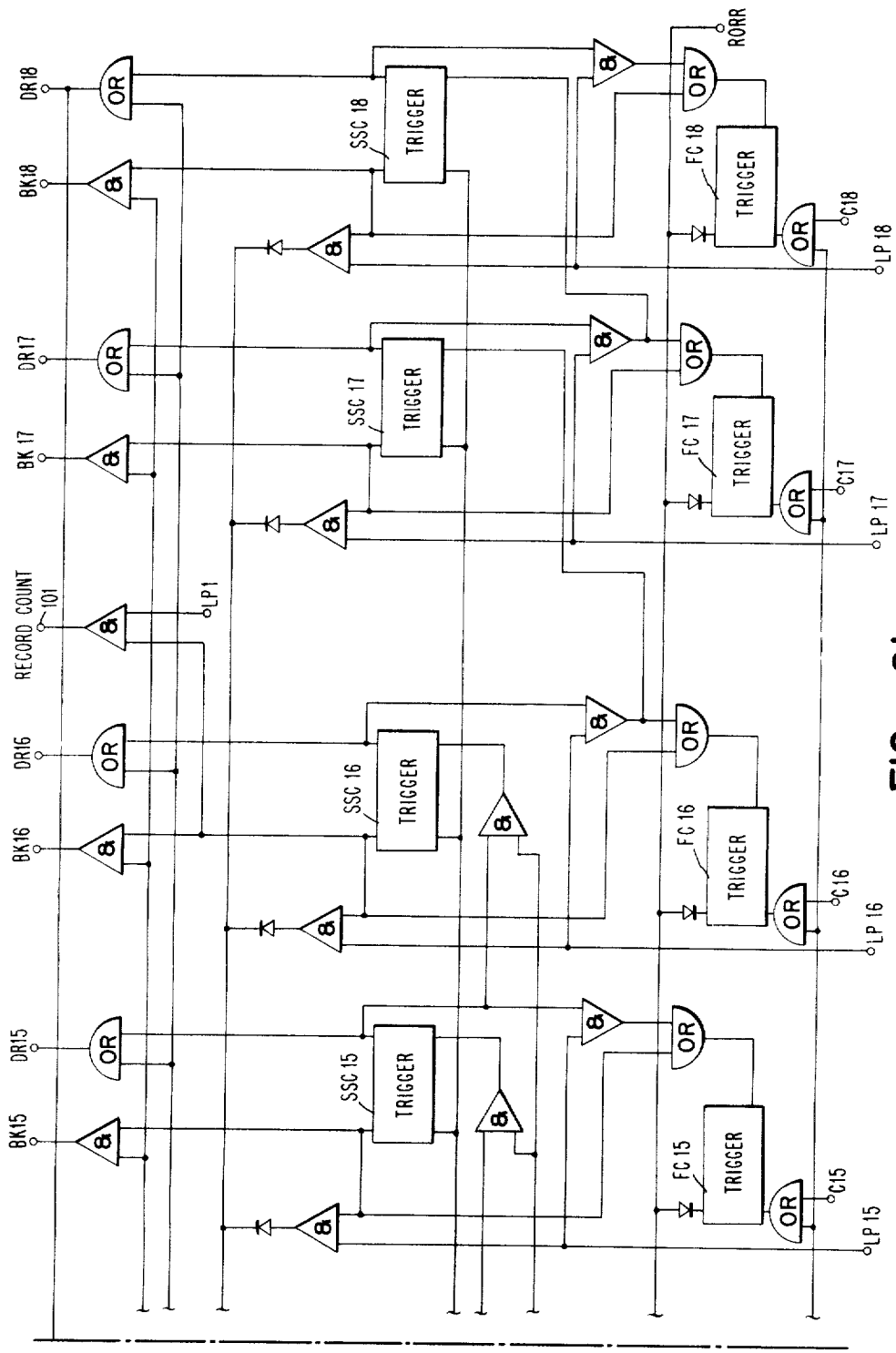

The detection of the first character of the first record at the second sorting station and the detection of the first character of the Sth record at sorting station 1 must occur within 28 character times, and will turn OFF triggers FC1 and FC2, thereby causing the read-out ring signal to be supplied to the read-out ring run terminal designated RORR in FIG. 6b, so that the read-out ring will operate as each pair of records pass the heads at sorting stations 1 and 2.

When the first lead pulse is sensed at the sorting station 3, the index trigger will be turned OFF as a result of the signal supplied from terminal LP3 through the AND circuit 125 to the common line 117 to the left-hand side of the index trigger. Accordingly, all the sprockets except the first and second will stop.

Sensing of the (S+1)th "lead" pulse at the first sorting station and the second "lead" pulse at the second sorting station occurs nearly simultaneously and after the last character of the preceding records has been rewritten so that triggers FC1 and FC2 are caused to turn ON, stopping the read-out ring. Sensing of the "first character" will then turn OFF triggers FC1 and FC2, the process continuing repetitively for each succeeding pair of records.

When S–1 "lead" pulses have been counted from the first sorting station read head, an "advance" pulse turns ON the index trigger and trigger SSC3 and consequently trigger FC3 in a manner similar to that previously described for the preceding triggers. The process continues in a manner similar to that described above until all of the loops are formed between the sort heads. At this time, triggers SSC1 through SSC16 will be ON, the index trigger will be ON, all of the triggers FC1 through FC18 will be OFF, the sorter tape 1 is advancing to bring the first "lead" pulse to the reading head at sorting station 17, and sorting is in process between all sort heads in a manner described in U.S. Patent 3,034,102.

Trigger SSC16, when ON, prevents the lead pulse sensed at the reading head at number 1 sorting station from being counted, so that no more advance pulses will be produced for the remainder of the current sorting "pass." Detection of the first "lead" pulse at sorting station 17 turns OFF the index trigger, causing sprockets 17 and 18 to stop. Detection of the second lead pulse at the sorting station 16 turns ON FC16, SSC17 and consequently trigger FC17.

Further operation of the FC triggers is dependent only on the sensing of "lead" pulses and first characters, as previously described. Control of the triggers SSC18, FC18 and the sprocket drive 18 is similar to that of those associated with the sorting station 17.

The last record of an input tape will be a single character record known as a "tape mark." Detection of this particular record will cause a "tape mark" record to be written on the sort tape 1 and also causes the next input file tape, if it exists, to write the next following records on the sort tape by appropriately switching the input. The "tape mark" record will pass through the sorter without being sorted, and, when detected at head 17 of sorting station 17, will cause the next output tape, if it exists, to be selected for writing succeeding records from the sort tape.

If additional input or output tapes do not exist, then a detection of the tape mark record at sorting station head 17 indicates an end of the sorting pass. This end of sorting pass condition will cause a reset pulse to be applied to the sprocket sequence control circuit, causing all sprockets to stop and energizing the pick winding 127 of the delooping relay DLR which remains energized over a circuit including the holding winding 129 of the relay, a normally open contact 131 of relay DLR, and the slack contact SC. With relay DLR picked and held by its own holding circuit, the transfer of its contact 133 supplies energy directly to the terminal DR18 from the OFF side of the index trigger, so that the sprocket 17 drives, and additionally, opens the circuit to each of the AND circuits associated with the sprocket brakes so that the sprockets 1 through 17 neither brake nor drive. Under this circumstance, due to frictional drag, all of the loops will be reduced to zero, and the slack will be taken up by the slack mechanism so that finally the slack contact SC will open, dropping out relay DLR and restoring the system to its normal condition. During this time also, the tape unit controls will cause the input and the output tapes to be rewound. At the end of this operation, the "input-output transfer" relay will pick so that the tapes which were previously input tapes now become output tapes and vice-versa.

After all conditions required for the next pass are met, such as all the input-output tapes rewound, the sort tape slack taken up, all of the rings reset, etc., as determined by suitable checking circuitry, an automatic start pulse is generated and the sorting operation, as previously described for the first pass, takes place for the second pass except that the feedback control counter is not set from the drum contacts and therefore the first loop generated on this pass will be one record less in length than the last set loop of the previous pass. The sorting pass is then made in a manner previously described for all of the records. The process repeats as many times as necessary, that is, until the first pass in which all the records are in proper sequence as determined by the sequence checking circuits between the sorting station 16 and the stations 17 and 18. On any pass, and probably the last pass, it is possible for the loop control circuits to cause a loop of one record length to be formed between any pair of adjacent sort stations, in which case succeeding loops must also be of only a single record length. In order to accomplish this, the record count pulse which causes the feedback control counter to be set with all triggers ON must be the last to affect this counter. All triggers ON inhibit further change in the feedback control counter so that all succeeding record count pulses produce advance pulses one for one.

Figure 7:
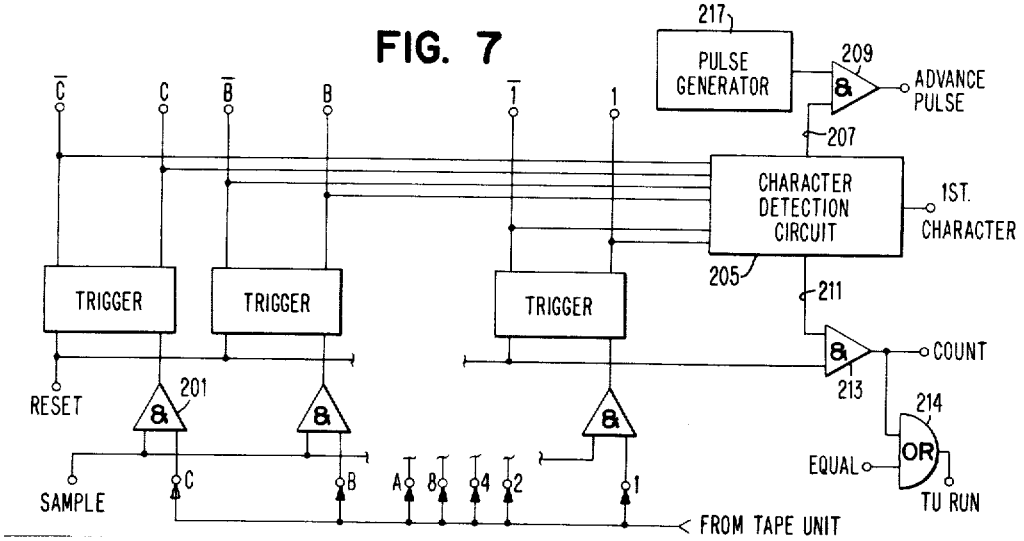
FIG. 7 is a schematic diagram of a single-digit input register employed in the present invention.

In controlling the input-output tape units when handling variable length records, in order to write equal length records on the sort tape, it will be assumed that the length of the longest record is known before the sorting operation begins and that this number is entered into a set of four dial switches known as record length switches on the console of the tape sorter. As the records are read in from the input tape unit onto the sort tape, the single-digit input register, one of which is shown in FIG. 7, is monitored in order to detect characters, so as to determine "record marks," "group marks," "first character" and blank tape. The single digit registers each constitute a number of triggers equal to the number of parallel bits, which are to be read from the input tapes. In the particular arrangement herein shown and described, the input tape information is encoded in a 7 bit parallel code, the bits being designated respectively as C, B, A, 8, 4, 2 and 1. Each of these bit lines from the input tape unit is sampled through associated AND circuits such as the AND circuit 201, by a sample pulse and supplied to the input of a trigger so that when the particular bit pulse is present at sample time, the trigger will be turned on. Each of the triggers is reset by a reset signal supplied in common to the side of the trigger which will turn the triggers off. Only three of the triggers have been shown and it will be understood that the remaining four are similar in structure to the ones shown. Each of these triggers provides an output from its ON and its OFF side, the OFF side output being designated by the bit nomenclature with a bar above the letter designating the bit, to indicate a negative or no bit condition, as is well known in logic operations. Connected to the outputs of each of the single-digit register triggers is a character detection circuit designated by a reference character 205, the details of which are not shown but which constitute simple combinational logic circuits to provide outputs indicative of the presence or absence of particular types of characters. One output from the character detection circuit is designated as 207 and is supplied to one input of an AND circuit 209, the other input to this AND circuit being a pulse generator operating at a suitable frequency so that when that output is present on line 207, advance pulses are supplied from the pulse generator through AND circuit 209. The output 207 indicates either a blank or a record mark or a group mark. Another output from the character detection circuit is to the terminal designated as "1st CHARACTER." Still another output from the character detection circuit is provided on a line 211, which indicates that the output of the single digit register is not blank and is not a record mark and is not a group mark. This output is supplied to one input of an AND circuit 213, the other input of which is the reset signal applied to reset all the triggers. The output of AND circuit 213 is supplied through terminal designated as COUNT, and is also supplied through an OR circuit 214 to a terminal designated TU RUN, the other input to this OR circuit being an EQUAL signal. The TU RUN output is a signal which is supplied to the input tape units to indicate that they should operate.

Figure 8:
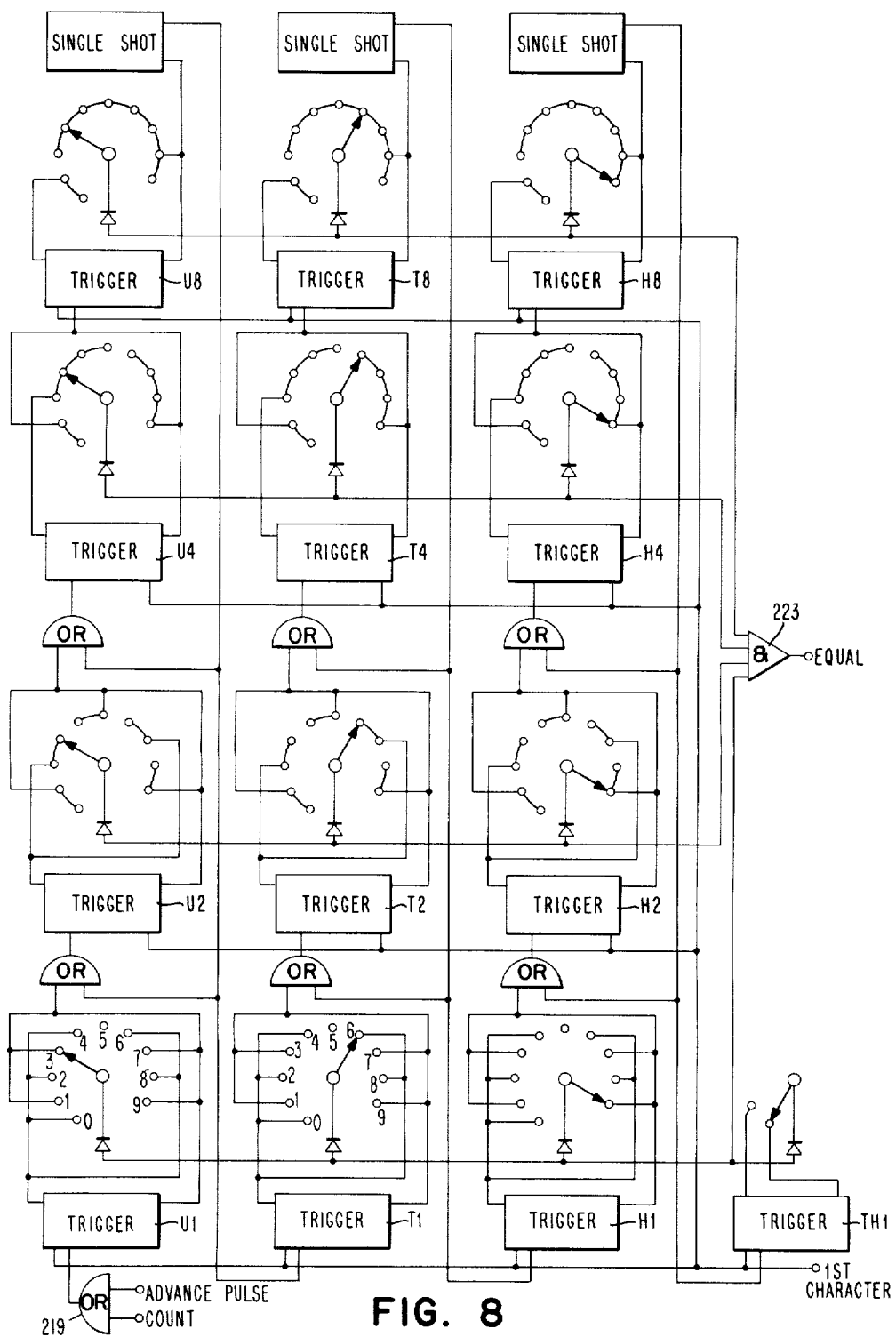
FIG. 8 is a schematic diagram of the binary-coded decimal counter and record length dial switches employed in the present invention.

The output at the first character terminal of character detection circuit 205 is supplied to a resetting line connected to each of the triggers shown in FIG. 8, which form a binary coded decimal counter arrangement which cooperates with the record length dial switches to provide an indication of an agreement between the setting of the switches and the number of counts supplied to the counter. Each character sensed at the single-digit input register, shown in FIG. 7, causes the binary coded decimal counters to be advanced one unit thereby counting the numbers of the characters in the incoming record. This counting, as such, terminates when a record mark is sensed at the input register and accordingly the counting is stopped and the TU RUN signal is turned off, since there is no output from AND circuit 213 of FIG. 7.

At this time, pulse generator 217, whose pulse rate is equal to the character rate of the input tape, connected to the input of AND circuit 209, supplies pulses through the AND circuit to the terminal designated as ADVANCE PULSE. These pulses, supplied through OR circuit 219 of FIG. 8, cause the counter to operate through a number of blank character spaces on the sort tape. When setting of the triggers in the binary coded decimal counter agrees with the setting of the dial switches so that there have been a number of characters and spaces spaced off on the tape equal to the number of characters in the longest length record on the input tape, the equal condition is signaled by an output from an AND circuit 223, to a terminal designated as EQUAL. Supply of this signal to the input of OR circuit 214 will cause a signal to be supplied to the input tape unit via the terminal TU RUN. This will cause the next record on the input tape to enter the tape sorter.

If it should be desired to write equal length records from the sorting tape as variable length records on the output tapes, a 19th reading head may be provided, not shown on the drawings, at which the detection of a record mark would signal the output tape unit to stop whereas detection of a lead pulse at this head signals the output to start. The 9th channel head which detects these marks at the 19th head location can be displaced from the other eight information channel heads either in the direction of the tape motion or in opposite direction as dictated by the mechanical start and stop characteristics of the output tape units so that the output tape units are up to their proper speed when the first character of a record on the sorting tape 1 is being sensed for its information by the information channel heads at the station 19. In this manner, record gaps of suitable length will be written on the output tapes.

In handling fixed length grouped records, each of the grouped records is followed by a "record mark" which serves to stop the counting process. If, after a predetermined time interval, a first character is detected, the counter is cleared and the file tape will not stop. When the last record mark of a group is detected, a "group mark" will be detected within a predetermined time interval which will then cause the counter to clear and will signal the input tape to stop. The pulse generator 217 is gated to the counter at that time via AND circuit 209, as previously explained, to "pace off" a record gap on the sorting tape equal in length to a record length from the file tape. In order to work properly, the "record length" dial switch must be set to a value of 150 less than the number of characters per record. From the foregoing, it can be seen that "intergroup" gaps would be blank space on the sorting tape and would be equal to a record length. Actually, a specially coded character must be written in each character position of the "blank" intergroup gap, since this gap will be treated as a record and must not be compared with the other records and it must not be moved from its position on the tape. The details of this operation will be described subsequently.

Figure 9:
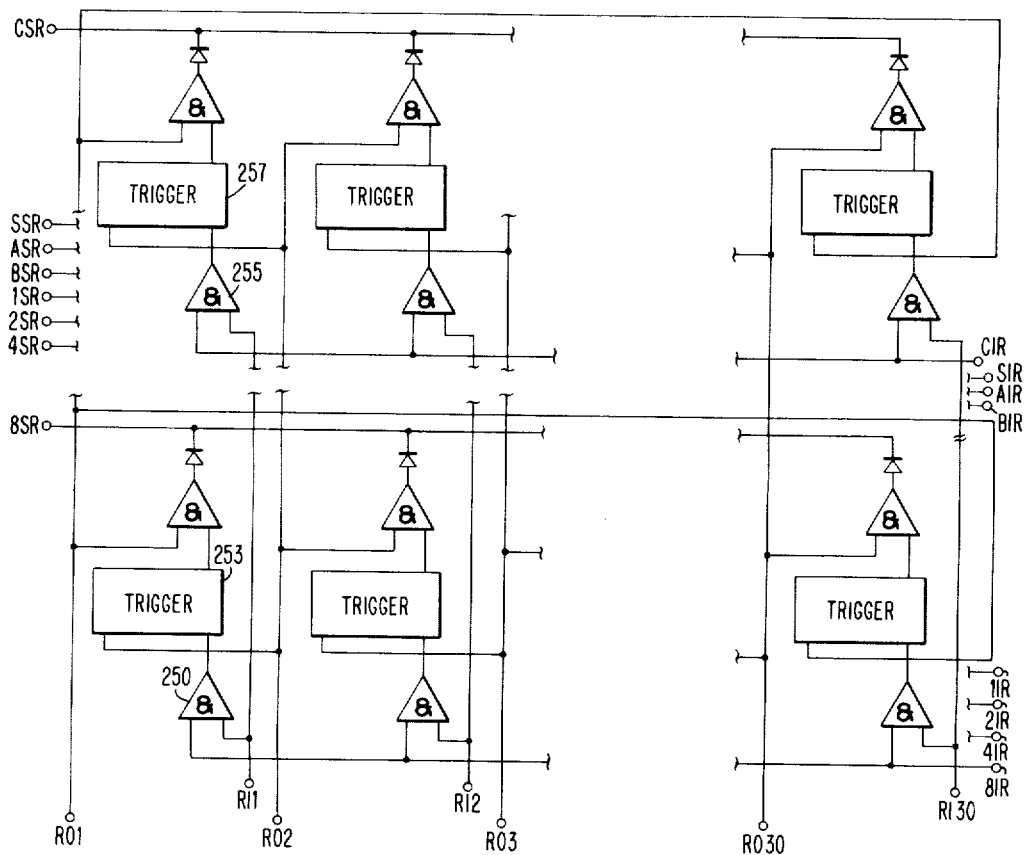
FIG. 9 is a schematic diagram of a duplex register employed in the present invention.

In order to provide the proper buffering of the information for sorting, it is necessary to store a multiplicity of the characters from the sorting station where the inputs are relatively random but the outputs are synchronized. For this purpose there is provided a suitable storage register, hereinafter referred to as duplex register, one of which is required for each of the sorting stations. For successful operation, the capacity of the register must be at least one character greater than the amount of phase error or lack of synchronism which can occur between any pair of sort heads. For example, the arrangement of a duplex register for one sorting station is shown in FIG. 9 of the drawings, which is a fragmentary view of a register designed to accommodate thirty characters. Each of the characters is made up of an eight bit code, including the following bits: C, S, A, B, 1, 2, 4 and 8. At the right-hand or input side of the register, it will be noted that a plurality of input terminals are designated by the reference characters CIR, SIR, AIR, BIR, 1IR, 2IR, 4IR and 8IR. Only that portion of the register dealing with the 8 and the C bits shown, and it will be readily understood that all of the intervening stages in this column are similar to those shown and which will be subsequently described. Similarly, on the left-hand side of the drawing, there is shown a plurality of output terminals designated CSR, SSR, ASR, BSR, 1SR, 2SR, 4SR and 8SR. Again, only the terminals CSR and 8SR are shown connected to their respective circuits, all of the remaining circuits being identical with the two shown in detail. The inputs are from associated single-digit input registers of the type as shown and described in FIG. 7, while the outputs are fed to associated single-digit serializing registers, to be described subsequently. The entry of information from the single-digit input registers is under control of an associated read-in ring, the details of which are not shown, since it may be of conventional design but which is provided with a plurality of outputs here designated as RI1, 2, and through RI30. The read-in ring is proportioned and arranged so that upon command, it will provide a series of consecutive signals to each of the read-in terminals at the duplex register, and accordingly the impulses will operate AND circuits shown associated therewith to admit input signals from the single-digit input registers. For example, when the read-in one impulse is provided to terminal RI1, if there is a signal present on the 8IR terminal from the single-digit input register, the AND circuit 250 will be enabled, and will set a trigger 253 which thereby stores the incoming bit of information on the 8 bit line. At the same time, if a bit of information is present on the CIR terminal, another AND circuit 255 will be enabled and will set a trigger 257. It will be apparent therefore that as the read-in ring progresses through its cycle, the information supplied over the input lines will be read into the consecutive triggers column by column, in accordance with the presence or absence of information on the input lines.

Additionally, a read-out ring of conventional design, also not shown, is utilized to read out the duplex registers in synchronism to the serializing register.

Figure 10:
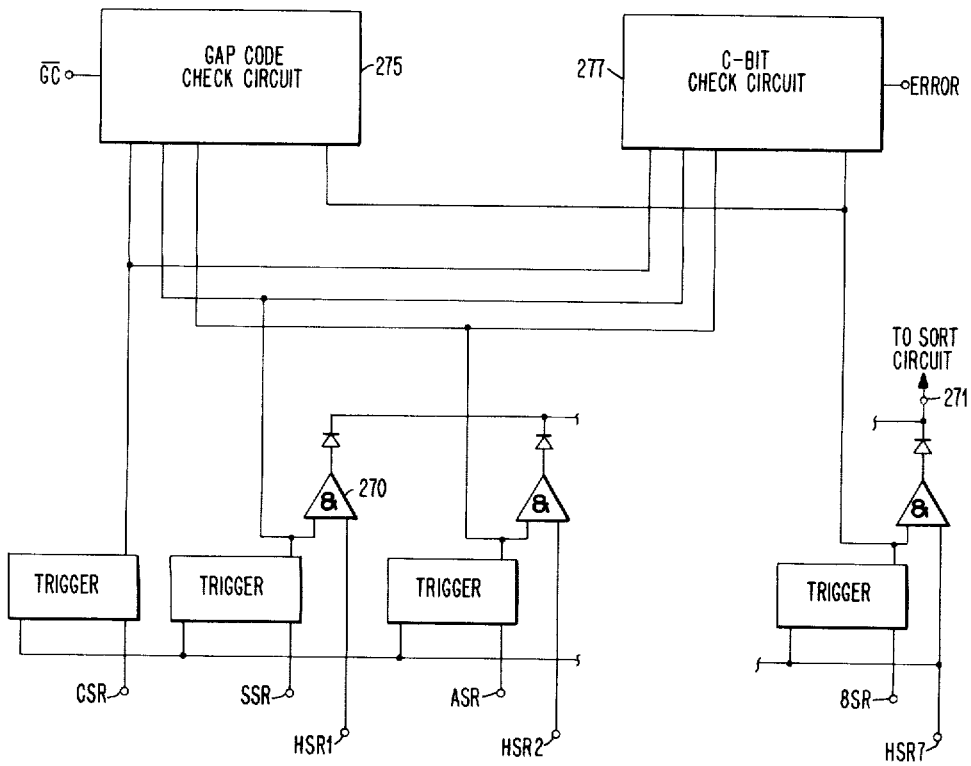
FIG. 10 is a schematic diagram of a parallel-to-serial register employed in the present invention.

The single-digit serializing register is shown schematically in FIG. 10 and constitutes a set of triggers, one for each of the information bit lines extending from the output of the duplex register of FIG. 9, such as CSR, SSR, ASR and 8SR. Only four of the lines are shown with their associated apparatus but it will be understood that the remainder of the circuitry is arranged in a manner similar to that shown on the drawing. The triggers associated with each of these lines are normally in a reset or OFF condition, the reset being provided by a signal from the high-speed read-out ring at the time that the ring is reading out the last stage. With information supplied to set the triggers from the output of the duplex register, the sequential signals supplied to the terminals HSR1 through HSR7 of the digit serializing register from the high-speed ring will enable the AND circuits associated with each of the triggers, such as the AND circuit 270 to supply an output to the terminal 271 which is, as designated, connected to the input of the sorting circuit per se. As each of the terminals HSR1 through HSR2 are sequentially energized, it can be seen that the information stored on the associated triggers is read out in serial fashion to the sort circuit. In addition, the serializing register is provided with two checking circuits, comprising combinational logic circuits one of which is a gap code check circuit 275, and the other of which is a C bit check circuit 277. The C bit check circuit will produce an error signal unless the C bits are as prescribed and in addition the gap code check circuit will provide a signal $\overline{GC}$ when no gap code character is detected. As mentioned above, when a signal is supplied to terminal HSR7 from the high-speed ring to read out the last position of the serializing register, it also supplies a resetting signal to all of the triggers in the register.

Figure 11:
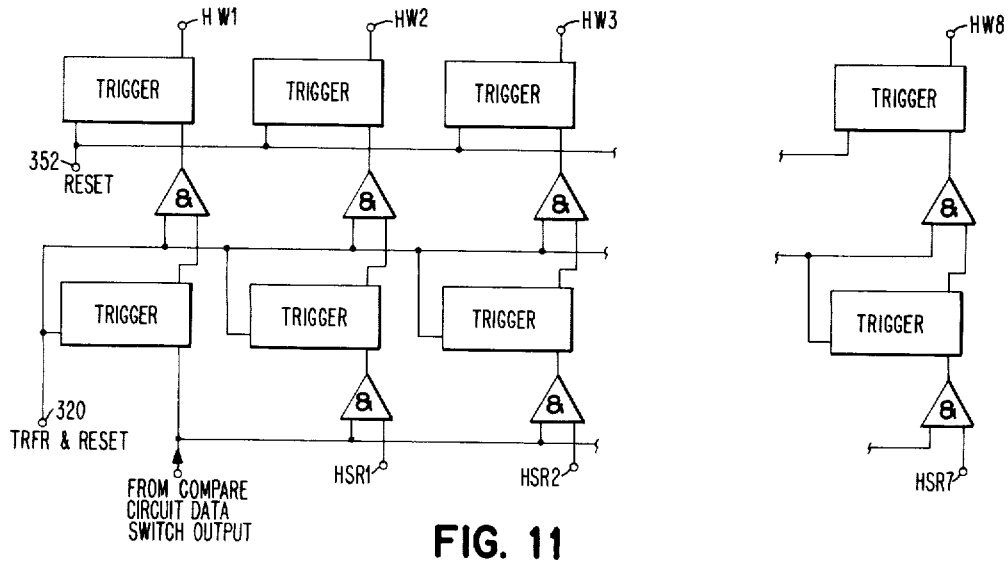
FIG. 11 is a schematic diagram of a serial-to-parallel register employed in the present invention; and, FIG. 12 is a schematic diagram of a modified sorting circuit which may be employed in the present invention.

FIG. 11 illustrates in diagrammatic form a paralleling register which is utilized to convert the output from the actual sorting apparatus which is in serial form, to a parallel form suitable for rerecording. The register comprises a plurality of triggers divided into two sets of eight each, corresponding to the number of bits which must be transformed from parallel to serial fashion. The first or lowermost set of triggers excepting the first is connected through a plurality of associated AND circuits to the data switch output line which represents the output from the data comparing and sorting circuits per se. This line is connected in common to all of the input AND circuits, the other input to these circuits being the consecutive outputs of the high-speed read-out ring. These outputs are designated as HSR1 through HSR7, and are energized consecutively in accordance with the operation of the ring to set the associated triggers ON if the output line from the data switch is energized at that time. At the end of each read-out cycle therefore, the triggers in the lowermost row will be set in accordance with the presence or absence of information at their respective bit positions. A signal is then supplied to the terminal 320, designated transfer and reset, which resets all of the triggers in the lowermost row and at the same time energizing the input AND circuits to the second or uppermost row of triggers, which circuits will supply an input to the associated uppermost trigger if the lower trigger has been set ON. The ON outputs of the upper row of triggers, designated by HW1 through HW8, are connected to the magnetic writing head amplifiers of the corresponding write heads of the tape sorter, and accordingly, will supply suitable output signals when the triggers are ON, these signals bring read out in parallel. After the read-out of the uppermost row of triggers, a reset signal applied to the terminal 352 will reset all of those triggers to their OFF state.

Having thus described the duplex register with the associated input and output serializing and parallelizing registers connected with the sorting apparatus, it can be noted that the duplex register will function to store sufficient information to make up for any out-of-phase conditions introduced by the start and stop characteristics of the sprocket clutches. This phase shift is introduced solely by the start and stop characteristics of the sprocket clutches and brakes and it will be constant once the loops have been formed between a particular pair of heads because no further starting or stopping of those sprockets will occur, and since they are attached to a common drive means, there is no possibility of them losing whatever synchronism they may have.

During the formation of the first loop between sorting stations 1 and 2, the record sensed at the first sorting station enters the duplex register for that station and is immediately rewritten character by character. When the first loop is complete, the first record will be sensed at the second sorting station probably out-of-phase with the 5th record sensed at sort station 1 but both of the records will be written in phase. This is of particular significance when handling grouped fixed length records because in this case, once a particular sort head begins its writing operation it must write continuously, otherwise gaps will be introduced between the records of a group. Since this cannot be allowed, it is necessary that each of the reading heads at the sort station read early or at least on time with respect to the reading heads at the preceding sort station.

In order to achieve this effect, the 9th or "lead" pulse reading head at each sort station is adjustable along the length of the tape track to compensate for the start-stop characteristics of each of the sprocket drives, and it should be adjustable to such a degree that each of the reading heads at the sort station will read from zero to 2 or three characters earlier than the preceding head at the preceding station. This requires that the start and stop characteristics of the sprockets be relatively stable or otherwise sufficiently large duplex registers must be provided.

Figure 12:
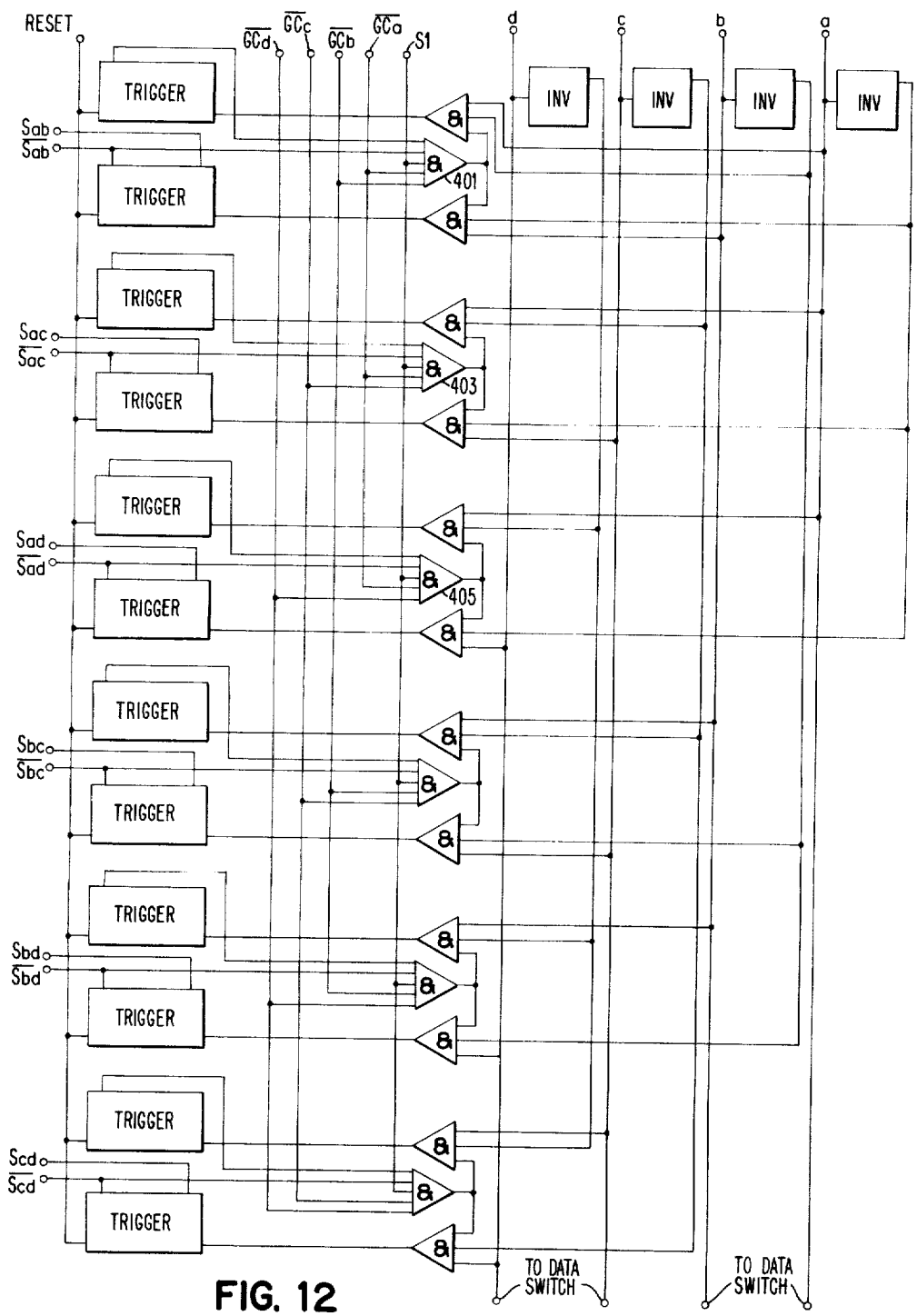

In FIG. 12, there is shown a modification of the "n-way" sorting circuits shown in FIG. 9 of copending application Serial No. 753,442, the arrangement having been modified to permit handling of grouped records. When handling grouped records, the intergroup gap will be a record consisting of specially coded characters which, when detected at one of these sorting stations, must effectively disconnect that sort station from the "n-way" comparing circuits so that the record will not be moved. The diagram shown in FIG. 12 shows the modification necessary for a 4-way sort circuit, the same principle being extended to any size sort circuit. The specially coded character will be called a gap code (GC), and when present at a particular single-digit serializing register it causes all 2-way comparing circuits which are connected to it to be turned OFF. As was earlier pointed out, the gap code characters are detected by special combinational logic circuits, and normally when the character is not present, there will be an output from the gap code detecting circuit. As shown in FIG. 11, these gap code characters are supplied to lines forming one of the inputs to the principal AND circuit in each of the sorting arrays, such as the AND circuit 401, which detects the presence of the no-gap code signal for the line A, and which is supplied to AND circuits 401, 403, and 405, each of these being the principal AND circuit in the sorting circuits involving the *a* output line. Accordingly, it should be apparent that if a gap code character does appear, one of the inputs to each of AND circuits 401, 403 and 405 will be removed, thereby disabling the AND circuits and disabling that particular sorting circuit. It is apparent from the drawings how the remainder of the gap code character signals are supplied to the AND circuits in the sort circuit arrangement.

The tape sorting system in accordance with the present invention also includes means for performing a sequence check as the records are transferred from the sorting tape to the output tape units. Normally, a sequence check is made between the information at sorting stations 17 and 18 by reading the records at these stations in a 2-way comparing circuit of conventional design. When handling grouped records and a "record gap" appears at head 17, the detection of the gap code at head 17 will cause comparing to take place between the location 18 and location 16. Detection of the gap code at location 18 causes comparing to take place between the location 17 and location 16 and detection of no-gap code causes normal comparing to occur between the location 18 and the location 17.

From all the foregoing, it will be apparent that the subject invention provides a new and improved arrangement for carrying out a sorting operation utilizing magnetizable tape, and following the teachings of U.S. Patent 3,034,102, but providing a novel arrangement for operatively spacing the sorting heads along the tapes for each successive sorting pass, by creating loops of various lengths of an endless sorting tape between the various sorting stations. The invention also provides a novel arrangement for starting and stopping the input tape units when it is necessary to record equal length records on the sorting tape, but where the input tape has variable length records.

While the invention has been particularly shown and described with reference to a preferred embodiment thereof, it will be understood by those skilled in the art that various changes in form and details may be made therein without departing from the spirit and scope of the invention.

What is claimed is:

1. In a data handling system for sorting data supplied thereto from at least one data source and supplying the sorted data to at least one data receiver, the combination comprising
   an endless magnetizable sorter tape,
   a plurality of sorting stations each including transducer means for reading data from said sorter tape and writing data thereon, and sprocket driving and braking means for governing the movement of said sorter tape past the transducer,
   means for writing the unsorted data on said sorter tape prior to the entry of the tape to the first sorting station,
   means for governing said sprocket driving and braking means to form said endless tape into a plurality of slack looks, one between each pair of adjacent sorting stations, each of said slack loops containing a predetermined number of data records and each of said loops containing a number of records different from the number of records in the others of said loops,
   means governing said sprocket and said driving means to change the length of said loops for each sorting operation,
   means connected to said transducers for sorting the data from said tape into a predetermined ordered sequence and rerecording the data on said sorter tape,
   and means for transferring the sorted data from said tape to said data receiver.

2. In a data handling system for sorting data supplied thereto from at least one data source and supplying the sorted data to at least one data receiver, the combination comprising
   an endless magnetizable sorter tape,
   a plurality of sorting stations each including transducer means for reading data from said sorter tape and writing data thereon, and sprocket driving and braking means for governing the movement of said sorter tape past the transducer,
   means for writing the unsorted data on said sorter tape prior to the entry of the tape to the first sorting station,
   means for governing said sprocket driving and braking means to form said endless tape into a plurality of slack loops, one between each pair of adjacent sorting stations, each of said slack loops containing a predetermined number of data records, the succeeding loops containing one less record than the next preceding loop, and the length of said loops being altered during each successive sorting operation,
   means connected to said transducer for sorting the data from said tape into a predetermined ordered sequence and rerecording the data on said sorter tape,
   and means for transferring the sorted data from said tape to said data receiver.

3. In a data handling system for sorting data supplied thereto from at least one data source and supplying the sorted data to at least one data receiver, the combination comprising an endless magnetizable sorter tape, a plurality of sorting stations each including transducer means for reading data from said sorter tape and writing data thereon, and sprocket driving and braking means for governing the movement of said sorter tape past the transducer, means for writing the unsorted data on said sorter tape prior to the entry of the tape to the first sorting station, means for governing said sprocket driving and braking means to form said endless tape into a plurality of slack loops, one between each pair of adjacent sorting stations, each of said slack loops containing a predetermined number of data records, comprising means for counting the records as they pass the first sort station and setting the length of the longest slack loop in accordance with a predetermined number of records, and means for setting each of the succeeding slack loops to either one record length less than the preceding slack loop, or else equal in length to the preceding slack loop, and for setting the length of the slack loops to different lengths for successive sorting operations, means connected to said transducers for sorting the data from said tape into a predetermined ordered sequence and rerecording the data on said sorter tape, and means for transferring the sorted data from said tape to said data receiver.

4. In a data handling system for sorting data supplied thereto from at least one data source and supplying the sorted data to at least one data receiver, the combination comprising an endless magnetizable sorter tape, a plurality of sorting stations each including transducer means for reading data from said sorter tape and writing data thereon, and sprocket driving and braking means for governing the movement of said sorter tape past the transducer, means for writing the unsorted data on said sorter tape prior to the entry of the tape to the first sorting station, means for governing said sprocket driving and braking means to form said endless tape into a plurality of slack loops, one between each pair of adjacent sorting stations, each of said slack loops containing a predetermined number of data records, the number of records in each of said loops differing from one loop to the next and being changed for each successive sorting operation, comprising counting means settable to a predetermined count in accordance with the number of records to be accommodated in the first slack loop, means governed by the counting means for controlling the sorter tape driving and braking means at each of said sorting stations, and means responsive to the formation of each loop for diminishing the setting of said counting means;

means connected to said transducers for sorting the data from said tape into a predetermined ordered sequence and rerecording the data on said sorter tape, and means for transferring the sorted data from said tape to said data receiver.

5. In a data handling system for sorting data supplied thereto from at least one data source and supplying the sorted data to at least one data receiver, the combination comprising an endless magnetizable sorter tape, a plurality of sorting stations each including transducer means for reading data from said sorter tape and writing data thereon, and sprocket driving and braking means for governing the movement of said sorter tape past the transducer, means for writing the unsorted data on said sorter tape prior to the entry of the tape to the first sorting station, means for governing said sprocket driving and braking means to form said endless tape in a plurality of slack loops, one between each pair of adjacent sorting stations, each of said slack loops containing a predetermined number of data records, the number of records in each of said loops differing from one loop to the next and being changed for each successive sorting operation, comprising counting means settable to a predetermined count and effective upon reaching that count to automatically decrease by one the number of inputs next required to produce an output, manually settable switch means for initially setting said counter to a value determined by the length of the longest record to be sorted and the number of records in the file, means governed by said counting means for controlling the sorter tape driving and braking means at each of said sorting stations, and means responsive to the formation of each loop for automatically decreasing by one the setting of said counting means;

means connected to said transducers for sorting the data for said tape into a predetermined ordered sequence and rerecording the data on said sorter tape, and means for transferring the sorted data from said tape to said data receiver.

6. In a data handling system for sorting data supplied thereto from at least one data source and supplying the sorted data to at least one data receiver, the data to be sorted being arranged in groups of varying length, the length of said groups being varied during successive sorting operations, means for recording equal length records for sorting on a sorting tape comprising, in combination, means for recording each group on said sorter tape, and means effective at the end of each group for supplying additional signals to said tape to fill in the spaces on the sorter tape so that each space is filled to its capacity.

References Cited by the Examiner
UNITED STATES PATENTS

| | | | |
|---|---|---|---|
| 2,907,010 | 9/1959 | Spielberg et al. | 340—172.5 |
| 3,015,089 | 12/1961 | Armstrong | 340—172.5 |
| 3,041,417 | 6/1962 | Stroud | 179—100.2 |

ROBERT C. BAILEY, *Primary Examiner.*

MALCOLM A. MORRISON, *Examiner.*

W. M. BECKER, P. J. HENON, *Assistant Examiners.*